Patented Jan. 27, 1931

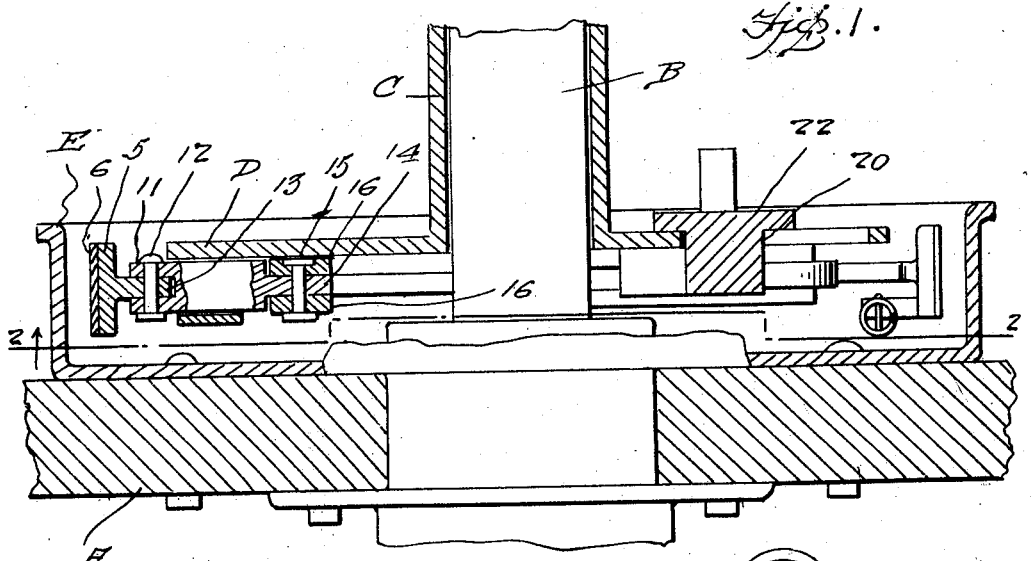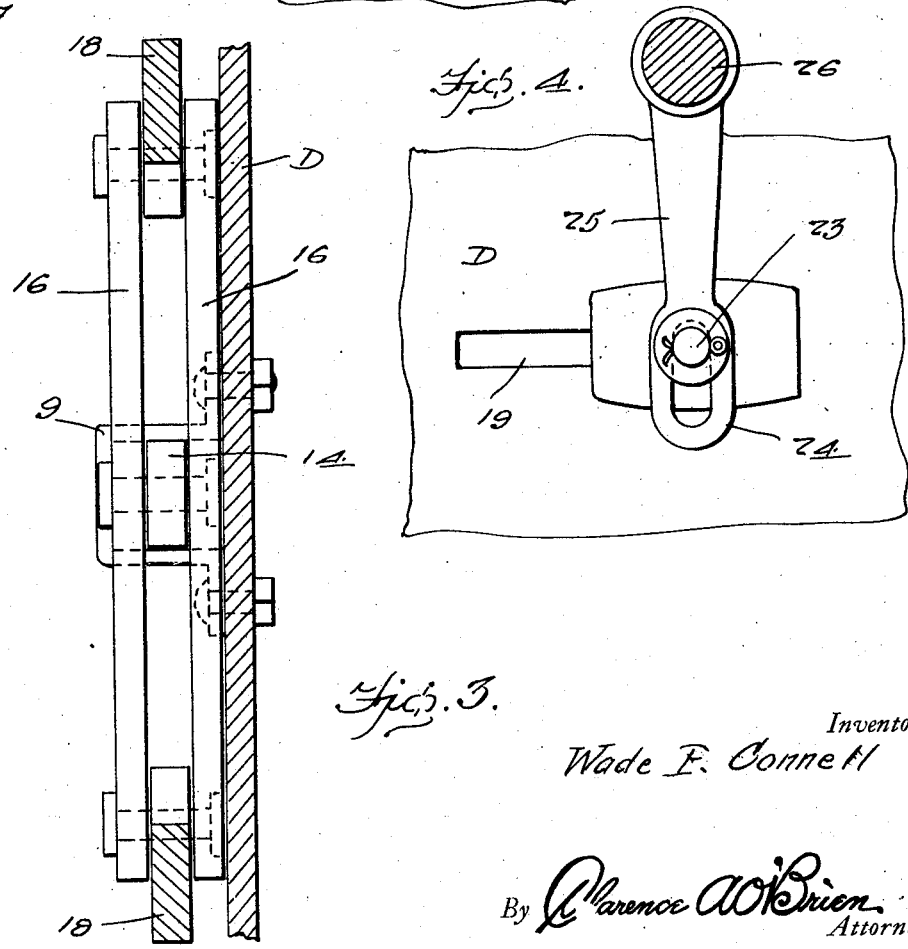

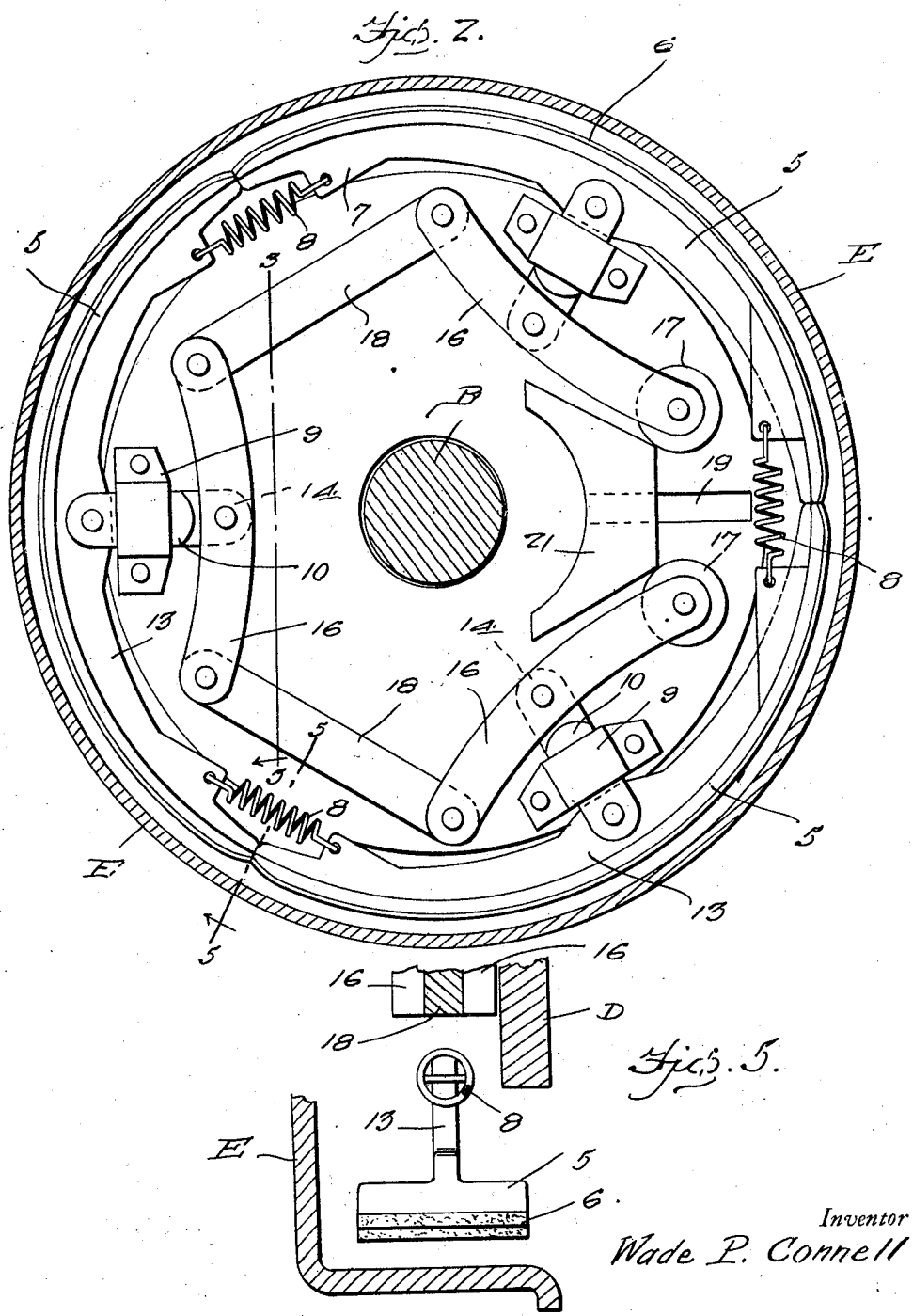

1,789,957

UNITED STATES PATENT OFFICE

WADE PARKS CONNELL, OF BOULDER, COLORADO

INTERNAL-EXPANSION BRAKE

Application filed September 27, 1927. Serial No. 222,350.

This invention relates to new and useful improvements in internal expansion brakes for automobiles and the like and aims to provide a brake that will produce a uniform pressure and resistance over a greater surface of the brake drum than is produced by brakes now in use and of which I have knowledge. This is for the reason that the arc described by the face of the brake shoe, with the brake material attached and settled, has a radius identical with the radius of the circumference of the interior surface of the brake drum, whereas the arc described by the ordinary rigid shoe has a shorter radius than that of the brake drum's interior circumference so that only a part of the shoe comes into contact with the brake drum.

Generally described, the present expansion brake consists of a plurality of complemental brake shoes of curvilinear formation and arranged in a circle and so operatively connected as to be simultaneously moved to a braking or non-braking position. Obviously, therefore, when moved into a braking position all of the shoes will contact the internal surface of the brake drum and not spaced areas thereof as is common in the general brakes now in use.

Furthermore, the operative construction for the shoes is such that immediately upon the release of the brake pedal the shoes will move inwardly out of engagement with the brake drum thus preventing dragging and heating.

The invention further aims to provide an expansion brake construction wherein the means for expanding the brake shoes is such that equal force will be applied to each shoe so that the entire inner surface of the brake drum is contacted, bringing about a proper and efficient braking operation, even though the drum be off center or imperfectly shaped.

One of the most important objects of this invention is to provide an expansion brake that is extremely simple in construction and inexpensive of installation and operation and one wherein the shoes may be readily relined.

With the foregoing and other objects in view as the nature of the invention will be better understood, the same comprises the novel form, combination and arrangement of parts hereinafter more fully described, shown in the accompanying drawings and claimed.

In the drawings wherein like reference characters indicate corresponding parts throughout the several views:—

Figure 1 is a horizontal section through my improved expansion brake as associated with a wheel to which is attached a brake drum.

Figure 2 is a longitudinal section taken substantially upon the line 2—2 of Figure 1, and looking in the direction of the arrows for disclosing the brake mechanism in side elevation.

Figure 3 is a cross section on an enlarged scale taken substantially upon the line 3—3 of Figure 2.

Figure 4 is a fragmentary plan view of the open side of the brake drum for disclosing the means for operating the brake shoe expansion mechanism, and, Figure 5 is an enlarged fragmentary section taken substantially upon the line 5—5 of Figure 2.

Now having particular reference to the drawings, A designates generally a vehicle wheel attached to the usual axle B around which is an axle housing C the inner end thereof being provided with a plate D while attached to the inner face of the wheel A is a pan-shaped brake drum E of generally conventional design. The diameter of the axle plate D is such that the periphery thereof will have material spaced relation with the interior surface of the drum E as clearly disclosed in Figure 1.

The brake structure per se consists of a plurality of curvilinear brake shoes 5 preferably three in number and having a suitable lining 6 upon their outer faces. These brake shoes 5 are arranged in a circle and are of such a length that when the inner ends are in engagement or in slight spaced relation with respect to each other, the braking surfaces thereof will be disposed in inward spaced concentric relation with the brake drum as disclosed in Figures 1, 2 and 5. These brake shoes are of any desired material and are formed adjacent their opposite ends with inwardly radiating complemental lugs 7—7 between adjacent ones of which are retractile coil springs 8 for the purpose of normally drawing the shoes in an inward direction out of engagement with the brake drum E.

Rigidly secured to the inner face of the axle housing plate D adjacent the edge thereof and intermediate the ends of the brake shoes 5 are link guides 9 through which are radially slidable link blocks 10 the outer ends of which are bifurcated as at 11 and within which bifurcated ends are pivoted as at 12 the intermediate portions of ribs 13 formed integrally with the respective brake shoes 5. The inner ends of these link blocks 10 are formed intermediate their opposite sides with inwardly radiating tongues 14 that are pivoted as at 15 between pairs of spaced arcuate shaped links 16—16.

Arranged between adjacent ends of certain opposed pairs of these links are anti-friction rollers 17—17 while interconnecting the remaining ends of the various pairs of links are single links 18 the ends of which are loosely pivoted between the ends of the pairs of links as clearly disclosed in Figures 2 and 3.

The axle housing plate D is formed intermediate the link carrying rollers 17—17 with a relatively elongated radial slot 19 slidable through which is a narrow rib 20 formed integral with a block 21 movable upon the inner face of the plate D between said rollers 17—17. The opposite sides of this block 21 are tapered in such a manner that the movement of the blocks radially from the axle B towards the drum E will cause the outward movement of the rollers 17—17 and an outward movement of the ends of the pairs of links 16—16 with which said rollers are associated. Obviously, such a movement will cause the outward radial movement of the link blocks 10 associated with said roller carrying links resulting in the true radial movement of the respective brake shoes 5 in an outward direction toward the braking surface of the drum E. The outward movement of the roller carrying ends of these pairs of links 16 will obviously cause the tangential movement of the single links 18—18 in a direction towards the left which movement will so act upon their interconnecting link structures 16 as to cause the true outward radial movement of the attached link block 10 and its complementary brake shoe 13. Obviously, therefore all of the brake shoes will move simultaneously and with equal force and in an accurate radial direction to contact the braking surface of the drum E throughout an area equivalent to the combined area of the three brake shoes so that a proper gripping and braking action will result.

On the outer surface of the axle housing plate D the rib 20 carrying the actuating block 21 is formed or provided with a plate 22 to which is slidably pivotally connected as at 23 the inner slotted end 24 of an arm 25 the outer end of said arm being attached to a rocker shaft 26 which shaft is suitably connected with a brake applying lever not disclosed. It is of course obvious that an application of the brake lever will cause the movement of the arm 25 towards the braking surface of the drum E which will of course affect the outward radial movement of the block 21 against the rollers 17—17 for bringing about the operation of the brake structural elements as previously described. Immediately upon the releasing of pressure upon the brake lever the shoe connecting springs 8 will control the inward movement of the shoes while the tapered faces of the block 21 will permit the rollers 17—17 to slide the same inwardly to the position indicated in Figure 2.

In view of the foregoing description when considered in conjunction with the accompanying drawings, it will be apparent that I have provided a highly novel, simple and efficient internal expansion brake mechanism that is well adapted for all of the purposes heretofore designated and even though I have herein shown and described the invention, as consisting of certain detailed structural elements, it is nevertheless to be understood that some changes may be made therein without affecting the spirit and scope of the appended claim.

Having thus described my invention, what I claim as new is:—

In a braking device of the character described, including a brake drum attached to the outer side of the wheel, a plate member mounted stationarily within said drum and in spaced relation therewith, and expansible leverage arrangement arranged at the inner side of the said plate, and a plurality of curvilinear shaped and circularly arranged brake shoes, a link connection between each of said shoes and the leverage arrangement, guide means on said plate through which said links are movable, an inwardly disposed lug adjacent each end of each shoe, and springs having their ends connected to corresponding lugs for contracting the shoes to a position with their ends in abutting relation, said springs being disposed in the circumferential direction of the shoes.

In testimony whereof I affix my signature.
WADE PARKS CONNELL.